(No Model.)

T. FREEMAN.
SULKY.

No. 502,093. Patented July 25, 1893.

Witnesses
N. B. Harris
M. F. Boyle

Inventor
Thomas Freeman
By
Thomas Drew Stetson
Attorney

UNITED STATES PATENT OFFICE.

THOMAS FREEMAN, OF DUBLIN, IRELAND.

SULKY.

SPECIFICATION forming part of Letters Patent No. 502,093, dated July 25, 1893.

Application filed March 18, 1893. Serial No. 466,598. (No model.)

*To all whom it may concern:*

Be it known that I, THOMAS FREEMAN, a subject of the Queen of Great Britain and Ireland, residing in Dublin, Ireland, have invented a certain new and useful Improvement in the Construction of Sulkies and Road-Carts for Trotting Horses, of which the following is a specification.

The object of my invention is to produce a new and improved safety sulky and road cart of simple and efficient construction, and of light draft, and which will afford the animal greater space for action than similar vehicles in common use.

In carrying out my invention I propose to dispense with the ordinary axle, and instead thereof to use a frame of metal or other suitable material as follows:—The shafts and side bars of the body are formed of one continuous piece, and are dipped or curved downward in the neighborhood of the wheel so as to run in the horizontal plane of the hub of the wheel. Each dipped or curved portion is provided with an elongated slot in which the wheel is carried by a suitable pin. The shafts and side bars are then connected parallel to each other by a bridge suitably arranged to stiffen the structure and support the seat. It stands much higher and therefore affords a more extended range for the action of the animal than the ordinary axle. From the seat forked braces extend forward and downward, and connect to the shafts or thills. In each brace near the fore-end is arranged a foot rest which is capable of adjustment so as to regulate the distance between the same and the seat according to the requirements of the driver.

In order that my said invention may be more readily understood, I will describe the accompanying drawings, forming a part of this specification, in which—

Figure 1:
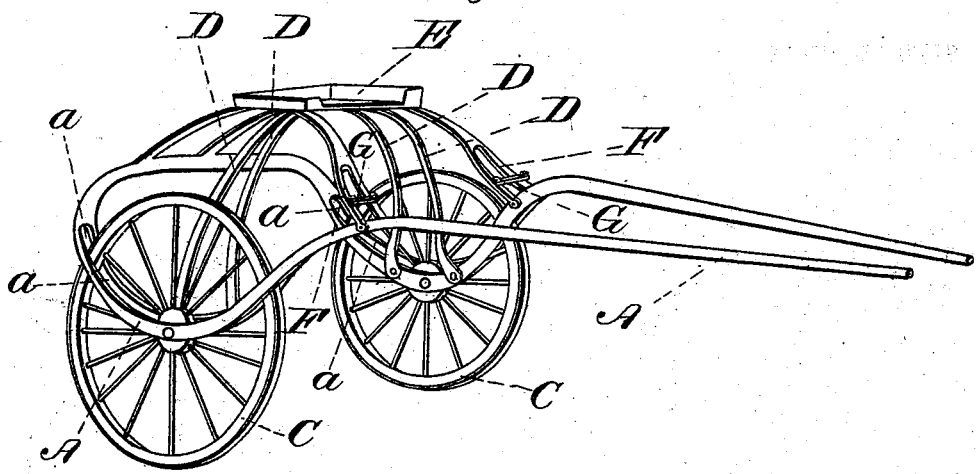
Figure 2:
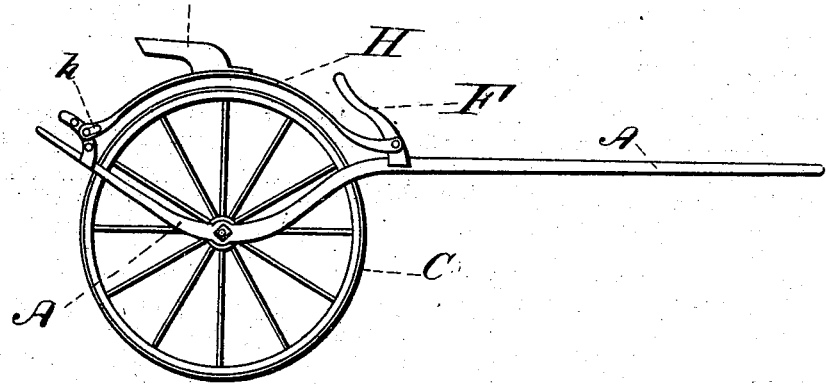

Figure 1 represents a perspective view of my improved "sulky." Fig. 2 is a side elevation showing the invention applied to a road-cart.

Similar letters of reference indicate corresponding parts in both the figures.

Referring to Fig. 1, A, A, are the shafts and side bars (of one piece) showing the dip or downward curve. In these are formed the elongated slots $a$, $a$, in which latter the wheels C C are carried, as shown. The hubs of the wheels are provided with ball-bearings to facilitate rotation, and are mounted each on a suitable pin extending across the slot and firmly set in the side bars, which latter are prolonged so as to meet and form the back of the frame-work. D D are the bridge rods or arms which spring from the side bars and carry the driver's seat E. These bridge rods and seat constitute the frame-work of the vehicle. Forked bars F, F, connect the front angles of the seat with the thills, and across these forked bars are clamped the adjustable foot rests G, G, which can be moved according to requirements. They are held by screws.

In the road-cart, (Fig. 2.) the side bars terminate in free ends and flat steel springs H, H, are introduced. These springs are hinged to the front of the frame-work and their rear ends slide freely in suitable slots $h$, $h$, mounted on the back of the frame work. In these springs the driver's seat is mounted, and the adjustable foot rests are the same as in the case of the sulky.

It is obvious that according to my invention the wheels being carried in an elongated slot are protected from injury in the event of two vehicles colliding and there can be no danger of the wheels dove-tailing.

Having thus described my invention it will be understood that the details herein described may be variously altered or modified without departing from the pinciple of my invention.

I claim as my invention—

1. In a carriage, the combined shafts and side-bars dipped or curved as shown, provided with elongated slots inclosing the wheels and extended and connected across the rear, in combination with the bridged arms D whereby the driver's seat is carried, all arranged to serve substantially as herein set forth.

2. In the construction of sulkies and road carts for trotting horses, the forked bars F serving as trees between the seat and the thills and the adjustable clamped foot rests G G, combined and arranged substantially as herein described.

Dated the 8th day of February, 1893.

THOMAS FREEMAN.

Witnesses:
A. WM. LABERTOUCHE,
  *Notary Public, Dublin.*
ANGELO FAHIE,
  *C. E, 9 Westland Row, Dublin.*